United States Patent
Chiang

(12) 
(10) Patent No.: US 6,802,248 B1
(45) Date of Patent: Oct. 12, 2004

(54) AUTOMATIC FILLING STUFFING APPARATUS

(76) Inventor: Chin-Ta Chiang, No. 3, Lane 267, Ho-Ping Rd., Ton-Tzu Hsiang, Taichung Hsien (TW)

( * ) Notice: Subject to any disclaimer, the term of this patent is extended or adjusted under 35 U.S.C. 154(b) by 0 days.

(21) Appl. No.: 10/728,761

(22) Filed: Dec. 8, 2003

(51) Int. Cl.[7] ............................. A23L 1/00; A21C 9/00; A21C 9/04; A21C 11/00; A23P 1/00
(52) U.S. Cl. .................... 99/450.7; 99/450.1; 99/450.2; 99/494
(58) Field of Search ........................ 99/353–355, 443 C, 99/443 R, 386, 400, 377–379, 494, 450.8, 450.1, 450.2, 450.6, 450.7; 426/512, 514, 282, 283, 285, 275, 502, 503, 293, 496, 297, 439; 425/115, 237, 327, 362, 363, 408, 335, 505

(56) References Cited

U.S. PATENT DOCUMENTS

| | | | | |
|---|---|---|---|---|
| 2,450,033 A | * | 9/1948 | Cohen | 99/450.1 |
| 4,321,858 A | * | 3/1982 | Williams | 99/353 |
| 4,691,627 A | * | 9/1987 | Roberts | 99/450.6 |
| 4,958,556 A | * | 9/1990 | Aquino et al. | 99/355 |
| 5,018,439 A | * | 5/1991 | Bordin | 99/450.2 |
| 5,289,761 A | * | 3/1994 | Spierts et al. | 99/450.6 |
| 5,687,638 A | * | 11/1997 | Makowecki | 99/353 |
| 6,083,545 A | * | 7/2000 | Nelson et al. | 426/293 |
| 6,099,885 A | * | 8/2000 | Nelson et al. | 426/512 |
| 6,170,391 B1 | * | 1/2001 | Pomara, Jr. | 99/450.6 |
| 6,257,127 B1 | * | 7/2001 | Lin | 99/353 |
| 6,272,979 B1 | * | 8/2001 | Morikawa et al. | 99/450.2 |
| 6,321,642 B1 | * | 11/2001 | Ou-Young | 99/494 |

* cited by examiner

Primary Examiner—Timothy F. Simone
(74) Attorney, Agent, or Firm—Birch, Stewart, Kolasch & Birch, LLP

(57) ABSTRACT

An automatic filling stuffing apparatus aims to automatically stuff filling in an elongated and unprocessed pastry. It includes a transporting unit and a pastry supply unit to supply the elongated pastry, a cutting unit to cut off the elongated pastry to individual pastry during the pastry supply process, a filling stuffing unit and a compression unit to dispose the filling on the pastry held on the surface of a holder, a forming unit to wrap the pastry with the filling contained therein to form a foodstuff desired, and a conveying unit to carry the formed and finished foodstuff to the next processing step.

8 Claims, 2 Drawing Sheets

AUTOMATIC FILLING STUFFING APPARATUS

FIELD OF THE INVENTION

The present invention relates to a filling stuffing apparatus and particularly to an automatic filling stuffing apparatus for reducing labor cost and improving operation convenience.

BACKGROUND OF THE INVENTION

Conventional filling stuffing apparatus mainly include a process station which has a holding device. The holding device has an indented holding space on the surface. There is a filling supply device located above the holding space to consecutively supply individual set of filling into the supply space for stuffing operation.

The aforesaid conventional filling stuffing apparatus require a lot of manpower to take care of the operation. And each station can supply only one set of foodstuff at a time. To process the foodstuff in a mass production fashion requires a great amount of labor. Such types of apparatus cannot meet the present requirements that highly focus on automation.

SUMMARY OF THE INVENTION

Therefore the primary object of the present invention is to provide an automatic filling stuffing apparatus that has a transporting unit and a pastry supply unit to continuously transport an elongated pastry.

Another object of the invention is to provide an automatic filling stuffing apparatus that has a cutting unit to cut off the elongated pastry to individual pieces.

Yet another object of the invention is to provide an automatic filling stuffing apparatus that has a filling stuffing unit and a compression unit to fill the filling in the pastry, and a forming unit to wrap the pastry with the filling contained therein to form a desired foodstuff. And a conveying unit is provided to carry the formed foodstuff to the next processing step.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
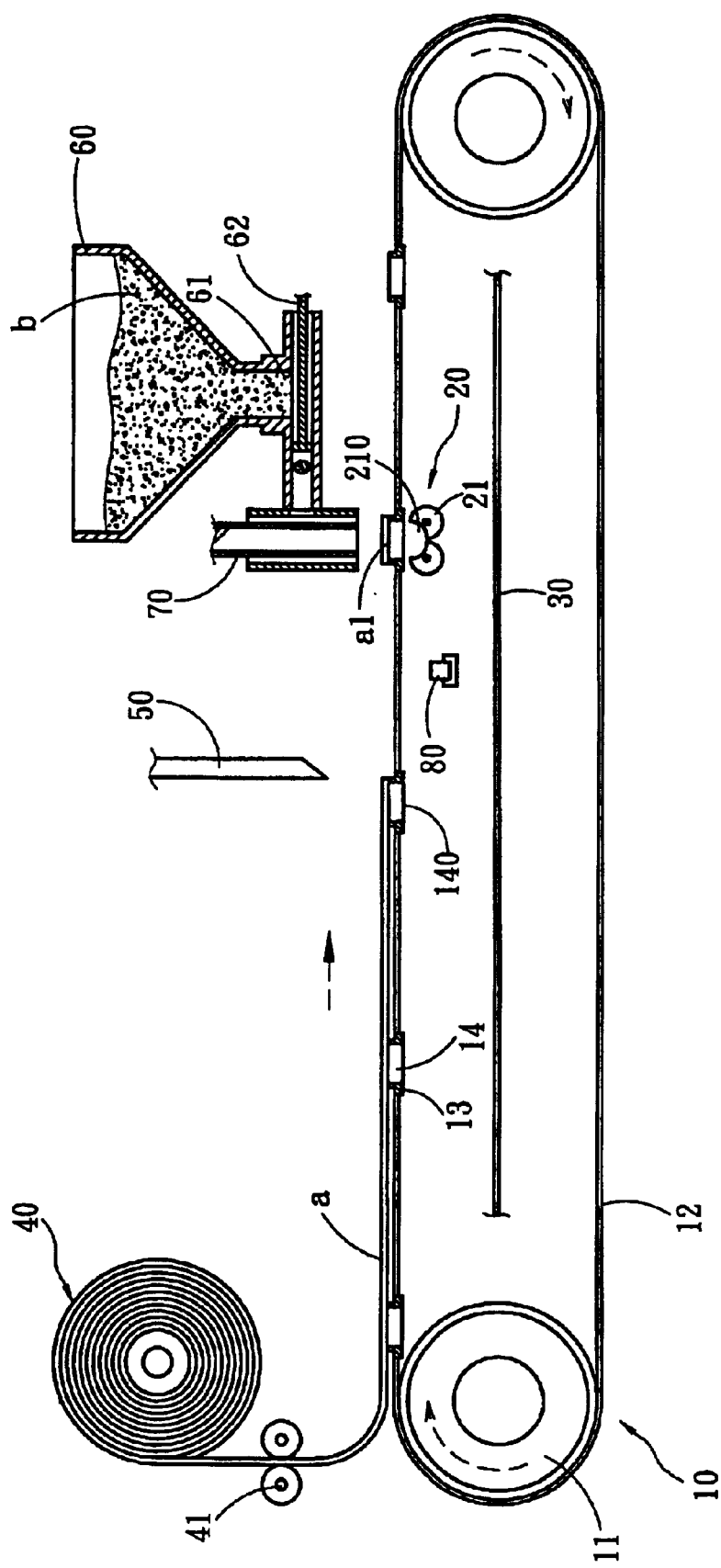
FIG. 1 is a schematic plan view of an embodiment of the present invention.
Figure 2:
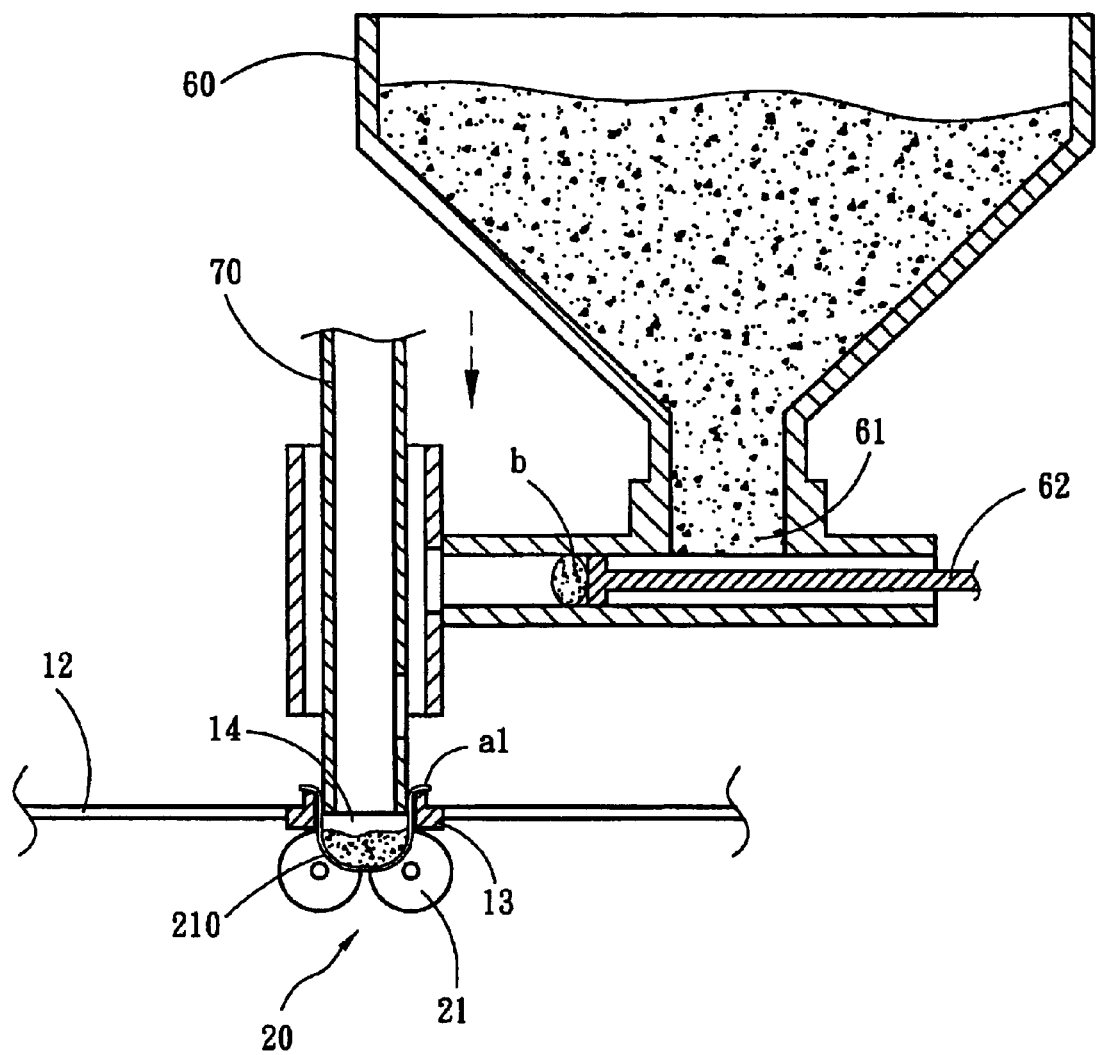
FIG. 2 is a fragmentary schematic view of the embodiment of the present invention.

Please referring to FIGS. 1 and 2, the automatic filling stuffing apparatus according to the invention includes:

- a transporting unit 10 which has respectively a driver 11 located at the front side and the rear side to couple with a transporting belt 12 (the driver 11 and the transporting belt 12 may be a gear and a chain) which is movable resulting from the driving of the driver 11. The surface of the transporting belt 12 has a plurality of holders 13 spaced from each other at a desired interval. Each holder 13 has an indented filling space 14 to hold a piece of pastry a of a selected size and shape. The filling space 14 has a port 140 at the bottom;
- a forming unit 20 located below the filling space 14 of the holder 13 including two rolling elements 21 (the rolling element 21 may be a roller). There is a trough 210 formed on the surface of the forming unit 20 that has a shape matching the foodstuff to be produced;
- a conveying unit 30 located below the forming unit 20 that may be a conveying belt to carry the foodstuff formed by the forming unit 20 to the next processing step;
- a pastry supply unit 40 located above one end of the transporting unit 10 for holding a plurality of elongated and formed pastries a and dropping a single sheet of pastry to pass through between two calendar rollers 41 which roll the pastry a and dispose the rolled pastry to the transporting unit 10 for moving the pastry a to the surface of the holder 13;
- at least one set of cutting unit 50 located above the transporting unit 10 and the pastry a that consists of a cutter to cut off the elongated pastry a to individual pastry a1 which is held and in contact with in the filling space 14 of the holder 13;
- a filling stuffing unit 60 located above the rear side of the transporting unit 10 for holding foodstuff filling b which is discharged through an outlet 61 at a lower side. There is a feeding device 62 located below the outlet 61 that may include an air cylinder;
- a compression unit 70 located above the filling space 14 of the holder 13 for moving up and down reciprocally. The compression unit 70 may include a hollow tube; and
- a detection device 80 located below the holder 13 close to the front side of the filling stuffing unit 60 to detect whether the arriving the holder 13 is filled with a pastry a, and transfer a detection signal to a receiving device (not shown in the drawings) located in the filling stuffing unit 60. When the holder 13 does not hold the pastry a, the detection unit 80 immediately transfers the signal to the filling stuffing unit 60 to stop the filling b from dropping so that filling stuffing operation for the holder 13 at the next stage may be stopped to prevent the filling from being discharged without the pastry. The detection device 80 can free tending of human labor and make automation possible.

When in operation, the pastry supply unit 40 continuously supplies the pastry a into the filling space 14 of a plurality of holders 13. The holders 13 are moved to the filling stuffing unit 60 by the transporting unit 10. During transportation of the elongated pastry a, the cutting unit 50 cuts off the elongated pastry a to individual pastry a1 which is held and in contact with the filling space 14 of the holder 13.

When each holder 13 is moved under the filling stuffing unit 60, it is paused. The filling b will be dropped from the filling stuffing unit 60 through the outlet 61, and the feeding device 62 pushes the filling b into the compression unit 70. As the compression unit 70 is a hollow tube, the filling b will be moved through the hollow tube to the pastry a, and the compression unit 70 continuously moves downward to compress the pastry a and the filling b as shown in FIG. 3. Moreover, the pastry a will sink through the port 140 to be in contact with the trough 210 formed on the surface of the forming unit 20 so that the resulting shape of the pastry a will match the surface of the trough 210 of the forming unit 20 to become a desired foodstuff matching the trough 210. In addition, as the forming unit 20 consists of two rolling elements 21, when the rolling elements 21 rotate, the foodstuff drops naturally onto the conveying unit 30 which carries the foodstuff formed by the forming unit 20 to the next processing step.

In summary, the automatic filling stuffing apparatus according to the invention can automatically process an elongated and unprocessed pastry a and stuff filling. It accomplishes the process through the transporting unit 10 and the pastry supply unit 40 that continuously transport the elongated pastry a, and the cutting unit 50 cuts off the elongated pastry a to individual pastry al, then the filling stuffing unit 60 and the compression unit 70 move the filling b to the pastry a held on the surface of the holder 13, and the forming unit 20 wraps the pastry a tightly with the filling b contained therein, and the conveying unit 30 carries the foodstuff formed by the forming unit 20 to the next processing step.

While the preferred embodiment of the invention has been set forth for the purpose of disclosure, modifications of the disclosed embodiment of the invention as well as other embodiments thereof may occur to those skilled in the art. Accordingly, the appended claims are tended to cover all embodiments which do not depart from the spirit and scope of the invention.

What is claimed is:

1. An automatic filling stuffing apparatus, comprising:

a transporting unit having a driver to couple with a transporting belt which is driven by the driver for moving, the surface of the transporting belt having a plurality of holders spaced from each other at a desired interval, each holder having an indented filing space which has a port at the bottom thereof;

a forming unit located below the filling space having a trough matching the shape of a selected foodstuff to be produced;

a conveying unit located below the forming unit for conveying the foodstuff formed by the forming unit to a next processing step;

a pastry supply unit located above one end of the transporting unit for holding a plurality of elongated and formed pastries;

at least one set of cutting unit located above the transporting unit and the pastry for cutting off the elongated pastry to individual pastry which is held and in contact with the filling space of the holder;

a filling stuffing unit located above a rear side of the transporting unit for holding a foodstuff filling which is discharged through an outlet at a lower side thereof, the lower side of the outlet having a feeding device;

a compression unit located above the filling space of the holder for moving up and down reciprocally; and a detection device located below the holder close to a front side of the filling stuffing unit for detecting whether the arriving holder holds the pastry.

2. The automatic filling stuffing apparatus of claim 1, wherein the forming unit consists of two rolling elements.

3. The automatic filling stuffing apparatus of claim 2, wherein the rolling element is a roller.

4. The automatic filling stuffing apparatus of claim 1, wherein conveying unit is a conveying belt.

5. The automatic filling stuffing apparatus of claim 1, wherein the pastry supply unit includes two calendar rollers for rolling the pastry and moving the pastry to the conveying unit.

6. The automatic filling stuffing apparatus of claim 1, wherein the cutting unit includes a cutter.

7. The automatic filling stuffing apparatus of claim 1, wherein the compression unit includes a hollow tube.

8. The automatic filling stuffing apparatus of claim 1, wherein the filling stuffing unit includes a receiving device.

* * * * *